US008880627B2

(12) United States Patent
Davenport et al.

(10) Patent No.: US 8,880,627 B2
(45) Date of Patent: Nov. 4, 2014

(54) PROVIDING TRANSPARENCY IN A MESSAGING SYSTEM WITH MULTIPLE MESSAGING CHANNELS

(75) Inventors: Benjamin Peter Davenport, Palo Alto, CA (US); Peter Xiu Deng, Mountain View, CA (US); Jonathan David Perlow, San Francisco, CA (US); Lucy Congyun Zhang, Palo Alto, CA (US); Ben Gertzfield, Santa Clara, CA (US)

(73) Assignee: Facebook, Inc., Mountain View, CA (US)

( * ) Notice: Subject to any disclaimer, the term of this patent is extended or adjusted under 35 U.S.C. 154(b) by 0 days.

(21) Appl. No.: 13/205,208

(22) Filed: Aug. 8, 2011

(65) Prior Publication Data

US 2013/0041957 A1 Feb. 14, 2013

(51) Int. Cl.
*G06F 15/16* (2006.01)
*H04L 12/58* (2006.01)

(52) U.S. Cl.
CPC .................... *H04L 51/36* (2013.01)
USPC ............................ 709/206; 709/204; 709/238

(58) Field of Classification Search
CPC ....... H04L 51/36; H04L 51/043; H04L 67/24; H04L 67/14; H04L 67/22; H04L 67/2838; H04L 67/2833
USPC ................. 709/206, 207, 224, 238–239, 204; 379/201.02
See application file for complete search history.

(56) References Cited

U.S. PATENT DOCUMENTS

| | | | |
|---|---|---|---|
| 7,305,069 B1 | 12/2007 | Day | |
| 7,328,242 B1 | 2/2008 | McCarthy et al. | |
| 7,664,814 B2 * | 2/2010 | Little, II | 709/204 |
| 7,752,275 B2 | 7/2010 | Malik | |
| 7,814,160 B2 * | 10/2010 | Burtner et al. | 709/206 |
| 8,223,940 B2 * | 7/2012 | O'Shaughnessy et al. | 379/201.02 |
| 2002/0120697 A1 | 8/2002 | Generous et al. | |
| 2003/0046421 A1 | 3/2003 | Horvitz et al. | |
| 2003/0185379 A1 | 10/2003 | O'Connor et al. | |
| 2004/0003042 A1 | 1/2004 | Horvitz et al. | |
| 2004/0203959 A1 | 10/2004 | Coombes | |
| 2006/0031329 A1 | 2/2006 | Robertson | |
| 2006/0053379 A1 * | 3/2006 | Henderson et al. | 715/751 |

(Continued)

OTHER PUBLICATIONS

PCT International Search Report and Written Opinion, PCT Application No. PCT/US2011/060035, May 18, 2012, nine pages.

(Continued)

*Primary Examiner* — Liangche A Wang
*Assistant Examiner* — Abdulkader M Alriyashi
(74) *Attorney, Agent, or Firm* — Fenwick & West LLP

(57) ABSTRACT

A messaging system facilitates communication between users through various messaging channels. The messaging system supports multiple communication channels and includes a messaging module that automatically selects one or more of the messaging channels for delivering a message to a recipient of the message using, for example, a set of policy rules or a trained model. The messaging module may also provide, in a user interface for sending and receiving messages, a visual indication of the selected messaging channel to the sender of the message to provide the user with transparency about how the message will be delivered. Additionally, the message may be delivered via multiple messaging channels, where the messaging module may rescind messages from some of the messaging channels upon receiving a reply from the recipient of the message or other confirmation that the recipient has seen the message via one of the communication channels.

15 Claims, 7 Drawing Sheets

(56) References Cited

U.S. PATENT DOCUMENTS

| | | |
|---|---|---|
| 2006/0059160 A1 | 3/2006 | Smola et al. |
| 2006/0173824 A1 | 8/2006 | Bensky et al. |
| 2007/0005654 A1 | 1/2007 | Schachar et al. |
| 2007/0005713 A1 | 1/2007 | Levasseur et al. |
| 2007/0143428 A1 | 6/2007 | Kumar et al. |
| 2007/0185961 A1 | 8/2007 | Perlow et al. |
| 2007/0198648 A1 | 8/2007 | Allen et al. |
| 2007/0203991 A1 | 8/2007 | Fisher et al. |
| 2007/0226628 A1 | 9/2007 | Schlack |
| 2008/0019353 A1 | 1/2008 | Foote |
| 2008/0028031 A1 | 1/2008 | Bailey et al. |
| 2008/0028251 A1* | 1/2008 | Komaki et al. ............... 713/502 |
| 2008/0182548 A1 | 7/2008 | Pattinson et al. |
| 2008/0215694 A1 | 9/2008 | Chen et al. |
| 2008/0222256 A1* | 9/2008 | Rosenberg et al. ........... 709/206 |
| 2008/0250332 A1 | 10/2008 | Farrell et al. |
| 2008/0250335 A1 | 10/2008 | Gusler et al. |
| 2008/0294735 A1 | 11/2008 | Muntermann et al. |
| 2009/0031232 A1 | 1/2009 | Brezina et al. |
| 2009/0031244 A1 | 1/2009 | Brezina et al. |
| 2009/0112871 A1 | 4/2009 | Hawthorne et al. |
| 2009/0119167 A1 | 5/2009 | Kendall |
| 2009/0125462 A1 | 5/2009 | Krishnaswamy et al. |
| 2009/0150507 A1* | 6/2009 | Davis et al. ................... 709/207 |
| 2010/0017492 A1 | 1/2010 | Reistad |
| 2010/0131858 A1 | 5/2010 | Schultz et al. |
| 2010/0223341 A1 | 9/2010 | Manolescu et al. |
| 2010/0257241 A1 | 10/2010 | Hale et al. |
| 2010/0306185 A1 | 12/2010 | Smith et al. |
| 2010/0318571 A1 | 12/2010 | Pearlman |
| 2011/0029647 A1 | 2/2011 | Ginevan et al. |
| 2011/0029923 A1* | 2/2011 | Xu et al. ....................... 715/825 |
| 2011/0038287 A1 | 2/2011 | Agarwal et al. |
| 2011/0041082 A1 | 2/2011 | Nguyen |
| 2011/0055309 A1 | 3/2011 | Gibor et al. |
| 2011/0082906 A1 | 4/2011 | Kreig et al. |
| 2011/0116610 A1 | 5/2011 | Shaw et al. |
| 2011/0173260 A1* | 7/2011 | Biehl et al. .................... 709/204 |
| 2011/0179126 A1* | 7/2011 | Wetherell et al. ............. 709/206 |
| 2011/0263278 A1 | 10/2011 | Riddle et al. |
| 2011/0302250 A1 | 12/2011 | Plotts et al. |
| 2012/0054132 A1 | 3/2012 | Aberdeen et al. |
| 2012/0054288 A1* | 3/2012 | Wiese et al. ................... 709/206 |
| 2012/0110085 A1 | 5/2012 | Malik et al. |
| 2012/0124146 A1* | 5/2012 | Hsiao et al. .................... 709/206 |
| 2012/0131474 A1 | 5/2012 | Panchadsaram et al. |
| 2012/0265824 A1 | 10/2012 | Lawbaugh |

OTHER PUBLICATIONS

PCT International Search Report and Written Opinion, PCT Application No. PCT/US2011/060032, Mar. 23, 2012, ten pages.

U.S. Appl. No. 12/913,701, filed Oct. 27, 2010.

U.S. Appl. No. 61/413,127, filed Nov. 12, 2010, Inventors: Hamlin et al.

McHood, J., "Top 5 Twitter Tips for Loan Officers," *Mortgage Loan Place*, May 10, 2009, two pages. [Online] [Retrieved Aug. 19, 2013] Retrieved from the Internet URL:http://www.mortgageloanplace.com/twitter.html.

Siegler, M.G., "Twitter Pumps Up Follower Email Notifications Further With Social Graph Juice," Aug. 26, 2010, two pages. [Online] [Retrieved Aug. 19, 2013] Retrieved from the Internet <URL:http://techcrunch.com/2010/08/26/twitter-email-notifications/.>.

Traction, "Amount of Ancestral Context to Include with Comments in Email Notifications," Mar. 22, 2008, four pages. [Online] [Retrieved Aug. 19, 2013] Retrieved from the Internet <URL:http://support.tractionsoftware.com/traction/page/Doc/Amount%20of%20Ancestral%20Context%20to%20with%20Comments%20in%20Email%20Notifications.>.

* cited by examiner

PROVIDING TRANSPARENCY IN A MESSAGING SYSTEM WITH MULTIPLE MESSAGING CHANNELS

BACKGROUND

The present disclosure relates to messaging systems, and more specifically to a messaging system that enables users to communicate via multiple different messaging channels.

People communicate with each other using electronic devices by sending and receiving electronic messages. Various messaging channels are available for electronic communication, such as electronic mail (email), web-chat, and many more. When sending a message, the sender arbitrarily chooses one of the messaging channels for communicating with the intended recipient of the message and sends the message through the selected messaging channel. However, the messaging channel selected by the sender may not be optimal for reaching the intended recipient. For example, the intended recipient of a message may currently have access to text messages but cannot currently access their email account. The sender may nonetheless decide to send the message to the recipient's email account because the sender is unaware of what messaging channels are best suited for reaching the recipient. The result is increased delays in communication between the sender and recipient that could have been avoided if the proper channels were utilized.

SUMMARY

Embodiments of the invention relate to a messaging system that enables users to communicate with each other via multiple messaging channels. In one embodiment, a messaging module of a messaging server receives a message addressed to a user of the messaging system (i.e., the recipient) and selects one or more messaging channels from a plurality of messaging channels. The messaging module selects the messaging channels based on or more signals that are indicative of, for example, the current status of the recipient or the recipient's past messaging activities. The messaging module then delivers the messaging to the recipient via the selected messaging channels. In some embodiments, the messaging module may also determine how to deliver the message via the selected messaging channels.

In some embodiments, the messaging module undergoes a training process that develops a predictive model for selecting the messaging channels based on the signals. The messaging module collects training data about associations between different signals and messaging channels and analyzes training data to generate a predictive model. The predictive model is later used, for example, to select one or more messaging channels for delivering messages to their recipients.

In another embodiment, the messaging module provides the sender of the message with transparent feedback about how the message will be sent, which builds trust in the use of the messaging system. The messaging module receives information identifying the recipient of a message, for example, from information entered by the sender of the message. The messaging module selects one or more messaging channels from a plurality of messaging channels for delivering the message to the recipient. The messaging module then provides, for display in a user interface to the sender of the message, a visual indication of the selected channel or channels in which the system has determined the message will be transmitted. Other information may be provided in the user interface, such as the presence of the recipient with respect to the messaging channels or the location of the recipient.

In another embodiment, the messaging module sends messages to a recipient via multiple messaging channels so that the recipient will receive the message by checking any of the channels. However, the messaging module also manages the messages in a manner that avoids overwhelming the recipient with duplicate messages. When a message is received for a recipient, the messaging module delivers copies of a message to the recipient via a plurality of messaging channels. Each copy is delivered via a different messaging channel so that the recipient may receive the message by checking any one of those channels. The messaging module receives a reply to the message or other confirmation that the recipient received the message from one of the messaging channels. In response, the messaging module rescinds copies of the message delivered to the other messaging channels.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
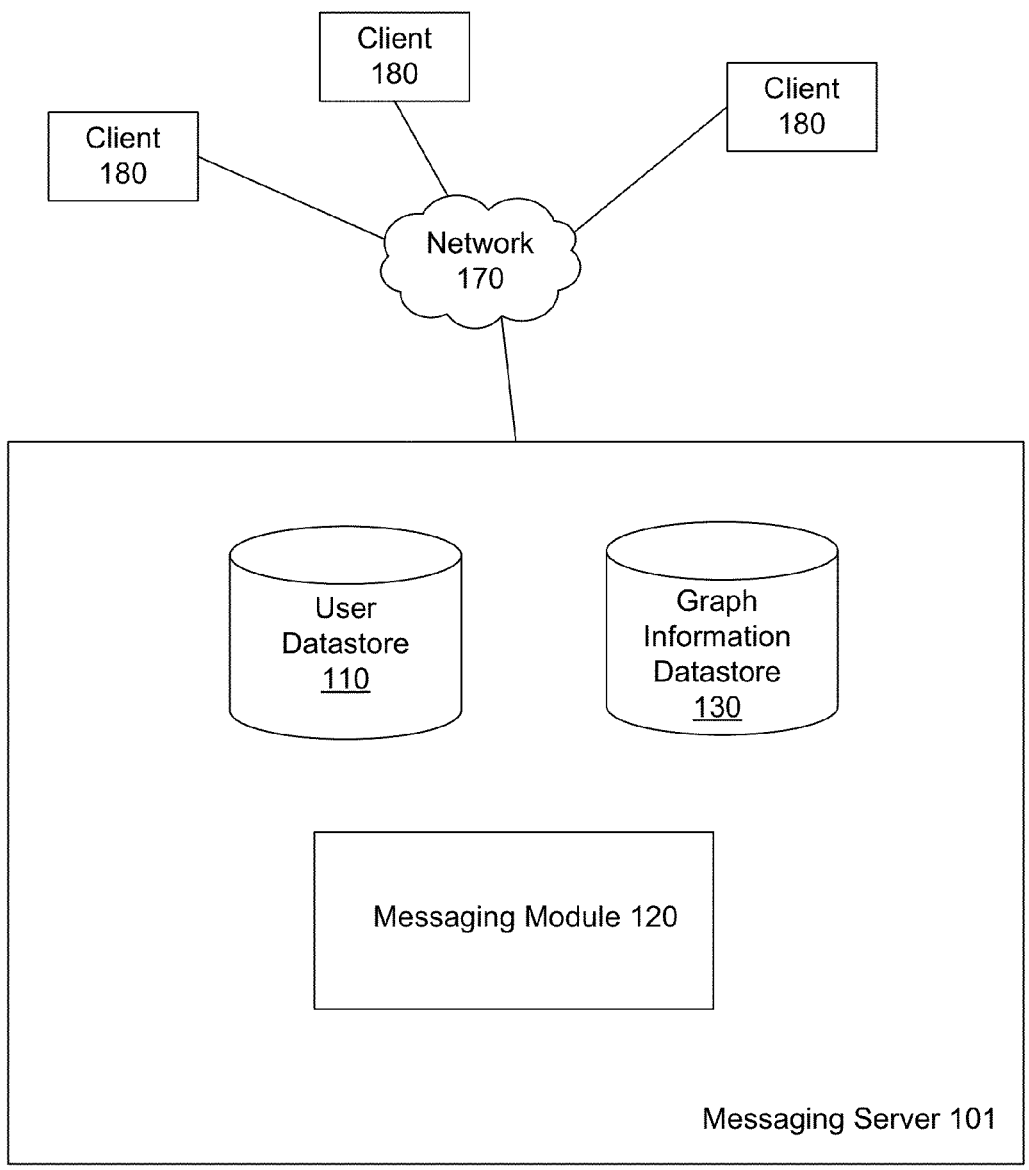
FIG. 1 is a high-level block diagram of a messaging system according to an embodiment.

FIG. 1 is a high-level block diagram of a messaging system 100 according to one embodiment. FIG. 1 illustrates a messaging server 101 and multiple client devices 180 connected by a network 170. In one embodiment, the messaging server 101 and client devices 180 each comprise of one or more computers. Alternatively, the client devices 180 may comprise any other type of computing device, such as a mobile phone, laptop, netbook, tablet, cable box, television, video game console, etc. In other embodiments there may be millions of clients 180 in communications with the messaging server 101.

A user of the client device 180 interacts with the messaging server 101 via an application, such as a web browser or a native application, to perform operations such as writing and sending messages to other users of the messaging system 100, or retrieving and reading messages sent by other users of the messaging system 100, and the like. For example, the application may be a web browser that loads a webpage provided by the server 101. Through functionality provided in the webpage, the user reads and writes messages. The client device 180 transmits messages to and receives messages from other users via the messaging server 101, and the messages may be communicated through any of a variety of messaging channels supported by the messaging server. In some embodiments, the messages can contain plain text, or they can contain other content such as pictures, videos, and attachments.

The client device 180 may also track and communicate various types of non-messaging information to the messaging server 101. Examples of non-messaging information include, for example, when the user last interacted with the client device 180, the location of the client device 180, the speed with which the client device 180 is moving, etc. The information may be communicated on request from the messaging server 101 or at some pre-determined interval.

The messaging server 101 comprises a user datastore 110, a messaging module 120, and a graph information datastore 130. The user datastore 110 stores various types of information about the users of the messaging system 100. Examples of information that may be stored for each user include: one or more email addresses for the user, the user's phone number, whether the user has a mobile messaging application installed on the user's phone, the user's activity calendar, an inbox of the user's messages, historical information about a user's past messaging activities, etc. In some embodiments, the messaging server 101 may also host the user's email account, or alternatively, the user may have an email account that is hosted by a different messaging server.

In one embodiment, the messaging system 100 is also a social networking system and further comprises a graph information datastore 130 that represents the users of the user datastore 110 as nodes that are linked together in a "social graph." Other objects of a social networking system besides users may also be represented as nodes in the graph information datastore 130, such as applications, events, webpages, pictures, etc. The graph information store 130 thus comprises information about the relationships between or among the objects, represented as the edges connecting the various object nodes. Various examples of edges in the social graph include: an edge between two user objects representing that the users are have a relationship in the social networking system (e.g., are friends, or have communicated, viewed the other's profile, or interacted in some way), an edge between a user object and an application object representing that the user has used the application, and an edge between a user object and a webpage object representing that the user has viewed the webpage, to name just a few. For example, if one user establishes a relationship with another user in the social networking system, the two users are each represented as a node, and the edge between them represents the established relationship; the two users are then said to be connected in the social network system. Continuing this example, one of these users may send a message to the other user within the social networking system. This act of sending the message is another edge between those two nodes, which can be stored and/or tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the indication of whether or not the user will attend the event is the edge.

Using a social graph, therefore, the messaging system 100 may keep track of many different types of objects and edges (the interactions and connections among those objects), thereby maintaining an extremely rich store of socially relevant information. From the social relationships represented by the edges of the social graph, an affinity can be determined that indicates the strength of a relationship between two users of the messaging system 100.

The messaging module 120 provides functionality for receiving messages from and delivering messages to users of the messaging system via messaging channels. The messaging module 120 supports multiple messaging channels, each of which provides a means for electronic communications with a user of the messaging system 100. Generally speaking, a messaging channel is any technology that may be used for delivering electronic messages to a user of the messaging system. A messaging channel may support the transmission of various types of information, such as text, pictures, video and/or audio. Examples of messaging channels include webchat (e.g., a chat application of a web-page hosted by the messaging server 101), e-mail, extensible messaging and presence protocol (XMPP), short message service (SMS) texting, mobile chat (e.g., via an application installed on a mobile client 180), chat services provided by gaming consoles, and application program interfaces (APIs) that third party application can use to send messages, among others.

In one embodiment, multiple messaging channels are available for delivering a message to a given user (the "message recipient"). The messaging module 120 selects one or more of the messaging channels for delivering the message. To ensure that the proper messaging channels are selected, the message module 120 bases its selection on one or more signals that provide, for example, information related to past messaging activities or the status of the message recipient. Thus, the user sending the message does not need to arbitrarily select the best messaging channel for reaching the message recipient as this decision is automatically made by the messaging module 120. In some embodiments, the messaging module 120 may select the messaging channels by applying a set of policy rules or a predictive machine learned model to determine the proper messaging channels.

In an additional embodiment, the messaging module 120 provides a visual indication of the selected delivery channel to the sender of the message. The indication is provided through a user interface that can be displayed on the client device 180. The indication may be provided to the sender before the message is delivered or as the message is being composed, which provides a sense of predictability in how the message will be delivered to the message recipient and builds trust in the use of the messaging system 100.

In yet another embodiment, the messaging module 120 delivers copies of a message to multiple delivery channels so that the recipient will receive the message by checking any of the messaging channels. The messaging module 120 receives a reply to the message from the message recipient through one of the delivery channels. In response to receiving the reply, the messaging module 120 rescinds copies of the messages sent to the other delivery channels, which avoids overwhelming the message recipient with duplicate messages.

Selecting Messaging Channels

Figure 2:
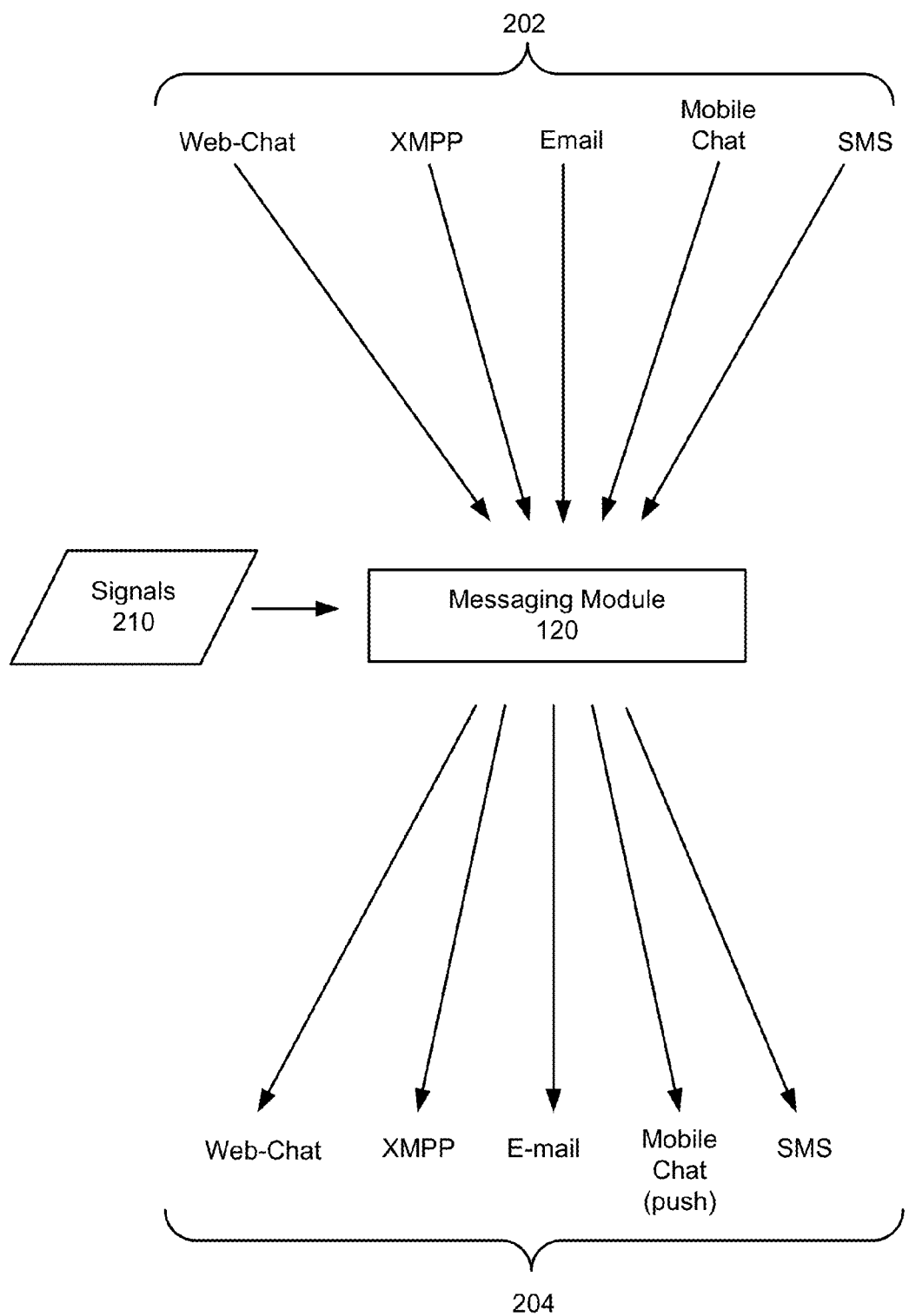
FIG. 2 illustrates an overview of receiving and delivering messages through messaging channels, according to an embodiment of the messaging module.

Referring now to FIG. 2, illustrated is an overview of receiving and delivering messages through messaging channels, according to an embodiment of the messaging module 120. As shown, messages may be received from a user of the messaging system 100 via any one of a number of incoming messaging channels 202. Using one or more informational signals 210 that provide, for example, information about the message recipient, the messaging module selects one or more outgoing messaging channels 204 for delivering the message. The signals 210 will be described in greater detail in conjunction with FIG. 3.

In some embodiments, the messaging module 120 receives the message and then selects the appropriate outgoing messaging channels 204 after the message is received. In other embodiments, the recipient of the message may already be known before the message is received, and so the messaging module 120 may select an outgoing messaging channel 204 in advance of receiving the message. The message is then delivered to the selected messaging channel(s). For example, a message received via an SMS channel may be delivered to the message recipient through both an SMS channel and an XMPP channel.

In some embodiments, the messaging module 120 not only determines which messaging channels 204 to use for sending the message, but also the manner in which the selected channels are used to send the message. In other words the messaging module 120 determines both where to deliver the message, and also how the message is to be delivered to the selected messaging channels. For example, the messaging module 120 may delay the delivery of messages or determine a mechanism for notifying the user of the message by considering one or more of the signals 210.

Figure 3:
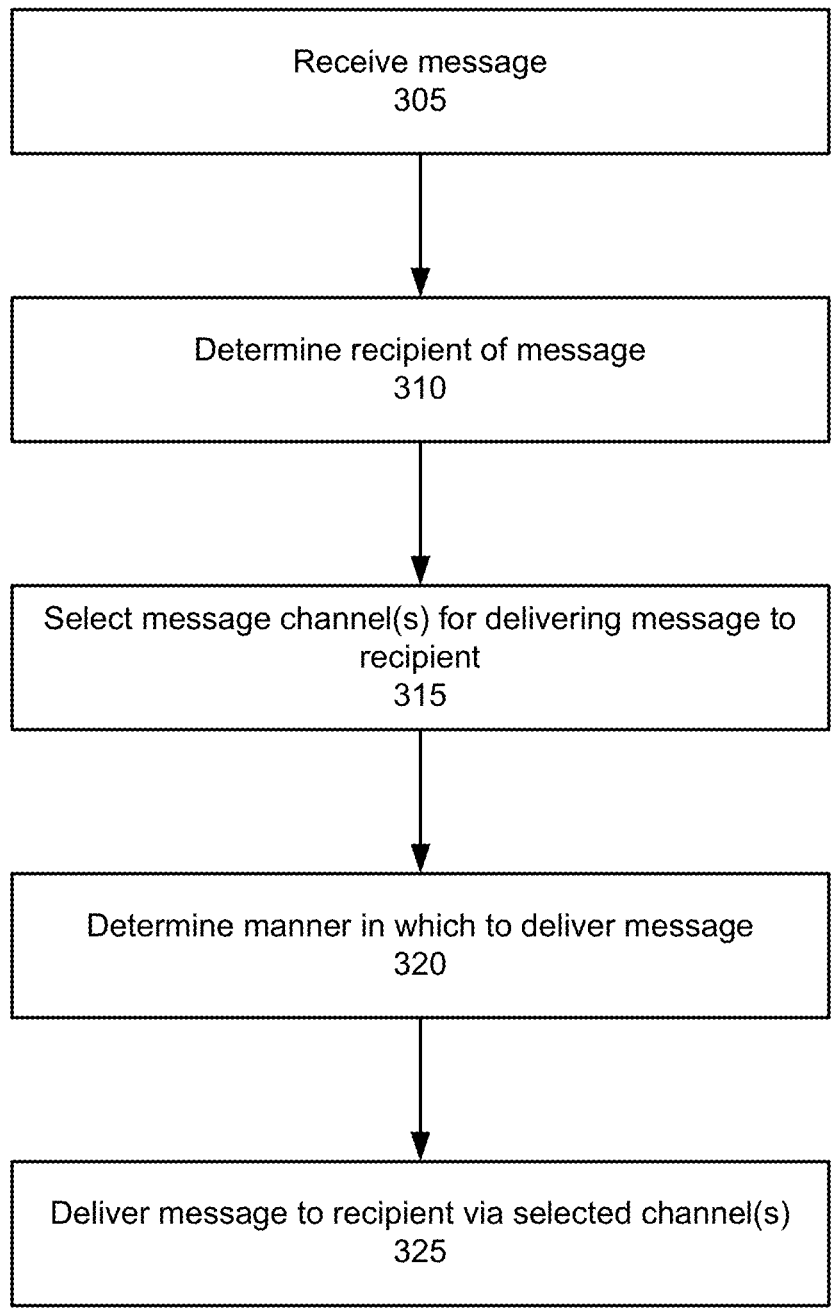
FIG. 3 illustrates a process flow for receiving and delivering messages through messaging channels, according to an embodiment of the messaging module.

Referring to FIG. 3, illustrated is a process flow for receiving and delivering messages through messaging channels, according to an embodiment of the messaging module 120. In step 305, the messaging module 120 receives a message from a user of the messaging system 100 that is intended for another user of the messaging system 100. The message may be received via any of a number of different messaging channels.

In step 310, the messaging module 120 determines the user that is the message recipient. The message recipient can be determined, for example, from metadata associated with the message that is matched to information in the user datastore 110 to identify a given user. In other embodiments, the messaging module 120 determines the intended recipient by receiving identifying information for the message recipient from the client 180 before the message itself is received.

In step 315, the messaging module 120 selects one or more delivery channels for delivering messages to the message recipient. In one embodiment, several different message channels are available for delivering messages. For a given user, the selection module 132 selects one or more channels by applying a set of policy rules that take into account various signals. In one embodiment, the policy rules are configured as a decision tree with pre-determined paths that lead to the conclusion of which message channels to select. For example, one path through the decision tree may be that if the sender is using a web-chat interface to send a message, and the recipient is not currently using a web-chat interface, and the recipient has a mobile application installed on their phone, a message is sent to the mobile phone application.

The messaging module 120 may consider different signals that guide the selection of the messaging channels, for example, signals that are representative of (1) the recipient's previous messaging activities, (2) the recipient's current status, (3) attributes of the message itself, and (4) other signals. Examples of the recipient's previous messaging activities and how they affect the selection of messaging channels include the following:

Last reply channel—The last reply channel refers to the message channel last used by the recipient to reply to the sender. The last reply channel is indicative of the message channel that is currently preferred by the recipient for communications. In one embodiment, the messaging module 120 is more likely to select the last reply channel as the proper messaging channel.

Historical messaging usage—Historical messaging usage refers to the recipient's usage patterns of various messaging channels over some period of time. For example, if a recipient has historically sent 65% of their messages via web-chat, 20% via email, and 15% via a mobile-chat application, these statistics may be used by the messaging module 120 to increase the likelihood that a message will be sent to the recipient via web-chat. As another example, if a user logs into the messaging system to check their emails frequently, this may increase the likelihood that a message will be sent to the recipient via e-mail.

Examples of indicators for the recipient's current status and how they affect the selection of messaging channels include the following:

Recent interactions with a client device—Recent interactions with a client device refers to when the recipient last interacted with a client device and the type of client device being used by the user. For example, if the recipient has recently moved the mouse on the recipient's computer, the likelihood that a message will be delivered to the recipient via web-chat is increased. As another example, if the recipient has recently interacted with the user's cellphone, the likelihood that a message will be delivered to the recipient via SMS or mobile-chat is increased.

Current time—Current time refers to the current time at the recipient's location. For example, if it is between 2-6 AM at the recipient's location, the messaging module 120 may select the email delivery channel instead of the mobile-chat channel for delivering the message.

Proximity between sender and recipient—The proximity between sender and recipient refers to the physical distance between the sender of the message and the recipient of the message. For example, if the sender and recipient are in close physical proximity and the sender sends a message with a phone via a mobile chat channel, the messaging module 120 may also send the message to the recipient via a mobile chat channel.

Velocity—Velocity of travel refers to the speed with which the recipient is moving. For example, the messaging module 120 may increase the likelihood that a message is sent to a mobile chat channel to reach the recipient's mobile phone if the recipient is traveling at a high rate of speed.

Calendar entries—Calendar entries refer to entries in the recipient's online calendar or entries in a calendar that are locally stored on the client device. Calendar entries indicate that the user may be busy and should not be disturbed. When the recipient's calendar shows that the user is busy, the messaging module 120 may increase the likelihood that a message is sent via an email channel as opposed to a mobile chat channel Examples of message attributes and how they affect the selection of messaging channels include:

Message length—Message length refers to the length of the message. For example, if a message contains a substantial amount of text, the messaging module 120 may decide to send the message via an email channel and not a chat channel.

Message attachments—Message attachments refers to whether there is an attachment in the message or the size of the attachment. For example, the messaging module 120 may only send messages with attachments via an email channel and not via a SMS channel because SMS channels may not be capable of handling attachments.

Examples of other signals and how they affect the selection of messaging channels include:

Channel availability—Channel availability refers to whether a channel is available for communicating with the recipient. For example, if the user is currently online and connected to the messaging server 101 through a web-chat application, the likelihood that the message will be delivered through web-chat is increased. As another example, if the user has a mobile-chat application installed on the user's phone, the likelihood that the message will be delivered via the mobile-chat channel is increased.

Originating channel—Originating channel refers to the channel used by the sender of the message to provide the message to message system. For example, if the sender is using an email channel, it increases the likelihood that the message will be also delivered to the recipient via the email channel.

Affinity between sender and recipient—Affinity between sender and recipient refers to the social relationship between the sender and recipient as determined from information in a social graph that may include, such as interactions between the sender recipient in a social network. For example, some messaging channels, such as SMS, are considered more personal and may only be available between users that have a strong affinity (i.e., social relationship) with each other. Thus, the messaging module 120 may increase the likelihood of selecting the SMS channel if there is a strong affinity between the sender and recipient of a message.

In some embodiments, the signals can be retrieved from the user data store 110. In other embodiments, the signals can be retrieved from the client devices 180 themselves. In other embodiments, the messaging module 120 applies a machine learned model, as opposed to policy rules, that determines a channel score for each messaging channel as a function of the various input signals. The messaging module 120 then selects the appropriate messaging channels based at least in part on the channel scores. The machine learned model will be described in greater detail in conjunction with FIG. 7.

In step 320, the messaging module 120 determines the manner in which to deliver the message to the selected channels. In other words, the messaging module 120 determines both where to send the message (i.e., the selected messaging channels) and how to send the message via the selected messaging channels (i.e., the manner in which the message is delivered). The determination of the manner in which to deliver the message may be based on one or more of the aforementioned signals.

In one embodiment, determining how to deliver the message comprises determining how to notify the recipient of new messages. The determination may be made based on the user's current status. For example, a user with a mobile chat application can be notified of a new message by either vibrating the user's phone, emitting an audible alert from the user's phone, or silently notifying the user by activating a blinking LED on the user's phone. The messaging module 120 may determine that if it is nighttime at the user's location and the user has not interacted with the user's phone in two hours, the notification should be the silent notification. As another example, a recipient using a webpage provided by the messaging server can be notified of a new email message by either lighting up a visual indicator (e.g., a messaging icon) displayed in the webpage or displaying a pop-up window notifying the user of a new email message. The messaging module 120 may determine that if no mouse movements have been detected in the last five minutes or that user's calendar entries indicates that the user is busy, the notification should be to light up the indicator.

In one embodiment, determining how to deliver the message comprises determining when to deliver a message. For some messaging channels, the messaging module 120 may batch together multiple messages and deliver the messages via the messaging channel as a single digest of messages at periodic intervals. In one embodiment, if the user's past messaging activities indicate that they are frequent users of the messaging system, the digests may be delivered with a higher frequency. If the user's past activities indicate that the user is not a frequent user, the digests may be delivered with a lower frequency. For example, if the user logs on to a webpage provided by the messaging server once per hour, the digests may be delivered every 30 minutes. If the user logs on once per week, the digests may be delivered every two days.

In another embodiment, messages can be delivered to the user based on the user's current status. For example, if the user's calendar entries indicate that the user is busy, the messaging module may decide not to send any messages to the user. Once the user is no longer busy, the messages are delivered to the user via one or more messaging channels as a single batch of messages or as a stream of messages.

Batching and delivering messages in this manner avoids overloading some messaging channels with a steady stream of individual messages. For example, suppose the messaging module 120 selects the web-chat channel and the email channel as the channels for communicating with a given recipient. Messages may be delivered instantaneously to the recipient via the web chat channel. However, for the email channel, the messages are batched together and periodically delivered as a digest of messages via the email channel.

In some embodiments, the messaging module 120 may actively insert and remove messages from the digest as the messages are acknowledged by the recipient. For example, during the time while the messages are being batched, the recipient may read or reply to some of the messages via the web chat channel. For messages that are already read or replied to through other messaging channels, the messaging module 120 may remove these messages from the digest. The digest thus contains only messages that have not been acknowledged by the recipient to avoid overwhelming the recipient with duplicate messages.

In another embodiment, the selected messaging channels may be prioritized and delivered to the channels in order of their priority. Messages are first delivered to higher priority channels and then delivered to the lower priority channels if no reply is received from the user within a pre-determined amount of time. For example, the selected messaging channels may be the web chat channel and the mobile chat channel, with the web chat channel being the higher priority channel. Messages addressed to the recipient are first delivered via the web chat channel. If no reply is received from the recipient within 20 seconds, the messaging module 120 then delivers the message via the mobile chat channel.

In some embodiments, the messaging module 120 makes the decision to try a lower priority channel automatically without any user input. In other embodiments, the sender is provided with the option of cancelling or proceeding with delivering the message via the lower priority channel and the messaging module 120 delivers the message to the lower priority channel according to this user input. In some embodiments, the priority of the channels may be configured in advance so that some channels always have a higher priority than other channels. Alternatively, if channel scores are calculated for each channel, channels with higher scores may be given higher priority and channels with lower scores may be given lower priority.

In step 325, the messaging module 120 delivers the message to the recipient via the selected channel(s) in the determined manner. In some embodiments, delivering the message may include transmitting the message to a client device 180. In other embodiments, delivering the message includes storing the message to the user's inbox, for example, if the selected channel is an email channel and the user's email inbox is hosted by the messaging server 101. If the selected channel is an email channel and the recipient email is not hosted by the messaging server 101, the messaging module 120 may transmit the message to the remote messaging server through a mail protocol such as simple mail transfer protocol (SMTP). The stored emails may then be retrieved by the message recipient at a later time.

Selectively delivering messages to selected messaging channels is beneficial for ensuring that messages reach the intended recipient in a timely manner. Moreover, if multiple channels are selected, copies of the message are delivered through each of the selected messaging channels, which further increases the likelihood that the message will reach the recipient and/or decrease the expected time until the recipient receives the message. As each messaging channel may have a different set of requirements about the content of the message, the copies of the messages sent to each channel may not be exact duplicates, but instead may be reformatted to comply with the requirements of the messaging channel.

User Interface

Figure 4:
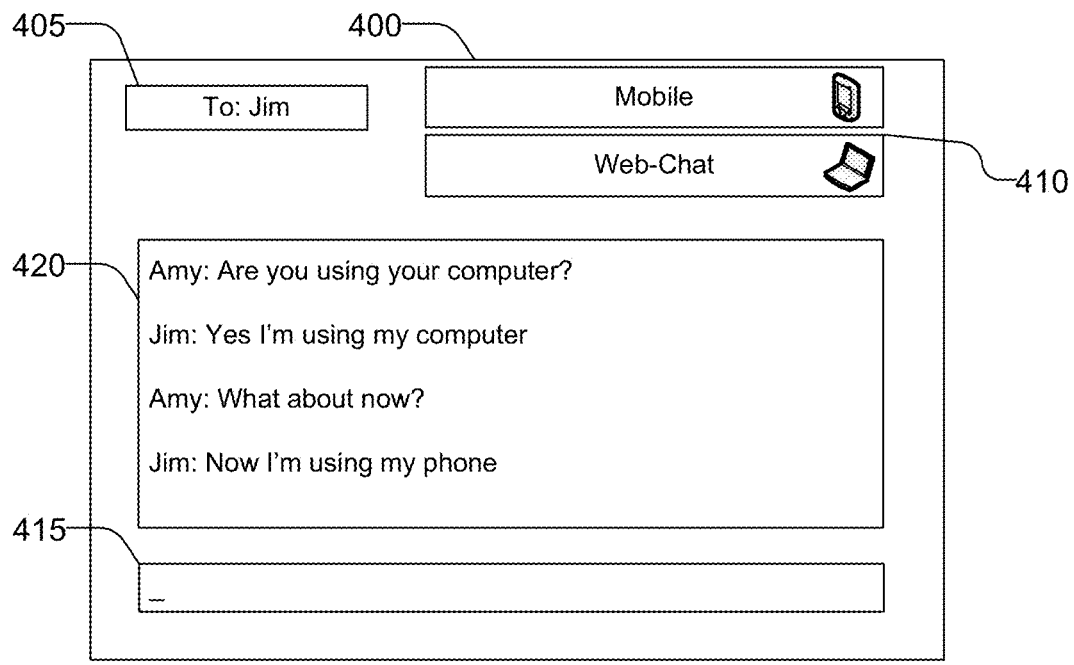
FIG. 4 illustrates a user interface provided by the messaging module to a client device, according to an embodiment of the messaging module.

Referring now to FIG. 4, illustrated is a user interface 400 provided by the messaging module 120 to a client device 180, according to another embodiment of the messaging module 120. In one embodiment, the messaging module 120 provides a user interface 400 to the client device 180 that includes an indication of how a message will be delivered to the recipient. The user interface 400 may be, for example, a web page provided by the messaging server 101 for composing emails or chatting with other users. The visual indication provides the message sender with a sense of predictability in how a message will be delivered and thus builds trust in the use of the messaging system 100.

As shown, the user interface 400 includes an interactive region 405 that allows a user to enter the name of an intended recipient for a message. Several visual indicators 410 in another region of the user interface 400 indicate which messaging channels will be used for delivering the message to the intended recipient. Here, the recipient of the message is a user by the name of Jim, and the visual indicators 410 indicate that the message will be send to a mobile chat application installed on Jim's mobile phone and to a chat window in Jim's computer browser.

The visual indicators 410 the user interface 400 may change over time. The messaging module 120 continuously updates the visual indicators 410 to correspond to the message channel that is being used to deliver messages to the recipient. For example, initially the selected message channels may be mobile chat and web chat. After sending a message to the recipient, the recipient may reply to the messaging through the web chat channel. In response to receiving this reply, the messaging channel 120 decides that the web chat channel is now the appropriate channel for delivering messages to the recipient and de-selects the mobile chat channel. The visual indicators 410 are then updated to show that the messaging channel is now web chat and not mobile chat. In some embodiments, the visual indicators may be interactive and are merely suggestions for the proper messaging channels. A user may thus select or de-select any of the recommended channels to over-ride the messaging channels selected by the messaging module 120.

The user interface 400 also includes a text box 415 in another region of the user interface 400 for entering the body of the message. The user interface 400 further includes another text box 420 for displaying a thread of messages that includes incoming messages (received from user Jim) and outgoing messages (sent to user Jim). In other words, the text box 420 acts like a chat window and keeps track of messages in a conversation between two users. The messages are maintained as a single thread in the text box 420, regardless of the messaging channel used to deliver or receive the message. Although the messaging channels may change over time as indicated by the visual indicators 410, the conversation between the sender and the recipient appears to continue uninterrupted through the user interface 400.

Additionally, the user interface 400 may have a different appearance than that shown in FIG. 4. In some embodiments, the interface 400 may include a visual indication of the recipient's current physical location. The location can be determined, for example, from GPS information in the recipient's phone, an IP address of the recipient's computer, or any other information available to the messaging system that is indicative of the user's location (e.g., information about a restaurant the user is currently eating at, information about a concert the user is currently attending, etc). In some embodiments, the interface 400 may include an indication of the recipient's presence with respect to a selected channel. Presence generally refers to whether the recipient is available for replying to a message through a given channel. For example, even through the web chat channel is selected, the user may not have a chat window open or the user may not have made any mouse movements in the past thirty minutes. Thus, the interface 400 may include an indication that the message will be sent via the chat web channel, but that the user may not be available to reply via this channel.

Figure 5:
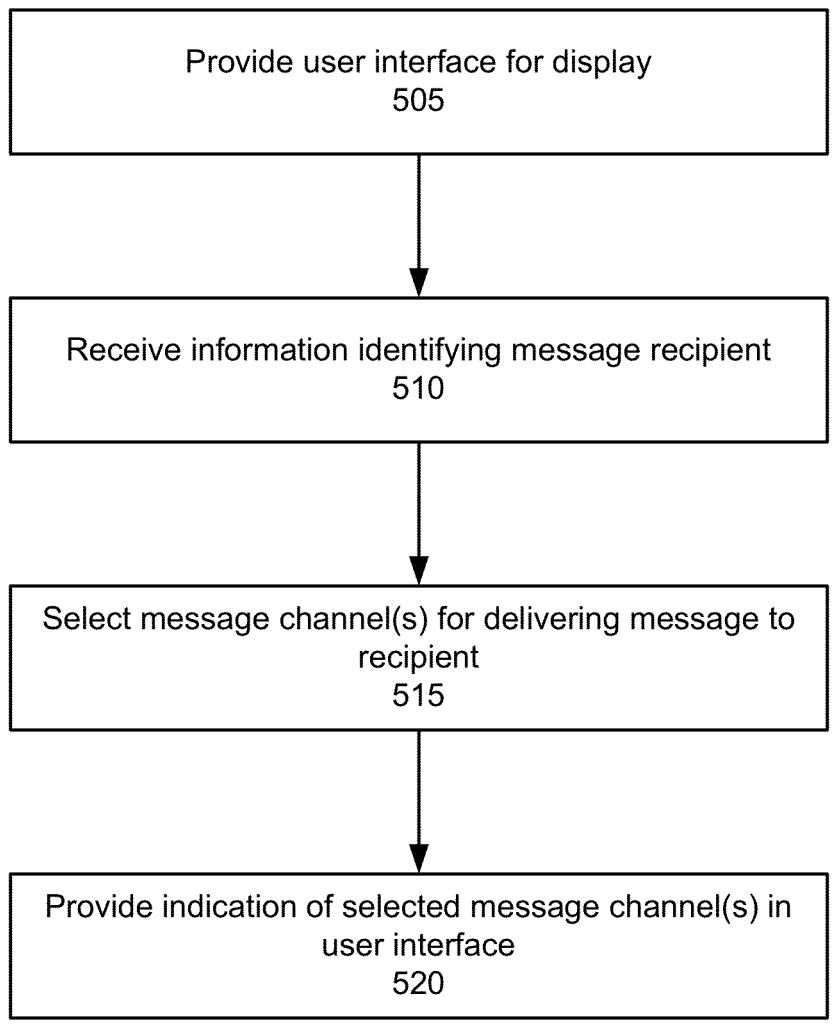
FIG. 5 illustrates a process flow for providing an indication of a selected channel in a user interface, according to an embodiment of the messaging module.

Referring now to FIG. 5, illustrated is a process flow for providing an indication of a selected channel in a user interface, according to an embodiment of the messaging module 120. In step 505, the messaging module 120 provides a user interface to client device 180 for display to a user of the client device 180. For example, the user interface may be similar to the user interface of FIG. 4. In step 510, the messaging module 120 receives information identifying an intended recipient of the message. For example, a user of a client device 180 may enter the name of a user that he or she wants to contact, or select a user from a list of users. This information is then transmitted to the messaging server 101 and received by the messaging module 120.

In step 515, the messaging module 120 selects one or more channels for delivering the message to the intended recipient. As multiple messaging channels may be available for delivering the message, the messaging module selects from among the different messaging channels using various information signals, as previously described in conjunction with FIGS. 2 and 3. The messaging module 120 selects the messaging channels automatically so that the appropriate messaging channels are chosen for contacting the intended recipient of the message.

In step 520, the messaging module 120 provides a visual indication of the selected message channel(s) in the user interface. The indication may be any visual indication that conveys information about the selected message channel(s), for example, text describing the selected message channel or a graphic that depicts the message channel. If multiple channels are selected, there may be a separate visual indicator provided for each channel. By providing these indications, the sender thus knows exactly where the message will be sent.

Subsequently, the sender enters the message and provides it to the messaging module. The messaging module 120 receives (not shown) the message from the sender and delivers the message to the recipient via the selected channel(s). As the recipient replies and the conversation between the two users progresses, the messaging module 120 continuously updates the visual indicators to correspond to the selected messaging channels if there is a change in the selected messaging channels (i.e., new channels are selected or old channels are de-selected). For example, the last channel used by the recipient to reply to the message may be selected by the messaging module 120 to be the appropriate delivery channel.

As new messages are sent and received, they are added to the thread and displayed in the text box 420 as a single thread even as the messaging channels for delivering the message change. For example, the recipient may send a reply message via one messaging channel (e.g., SMS), and then later send another reply message via a different messaging channel (e.g., web-chat). Both messages will be provided for display as part of the same thread or conversation in the text box 420. The sender is thus provided with a single interface that seamlessly transitions between different messaging channels automatically without interrupting the flow of the conversation.

Rescinding Duplicate Messages

In one embodiment, the messaging module 120 receives a message and delivers the message to its recipient via multiple messaging channels to increase the chance that the recipient will receive the message and/or decrease the expected time until the recipient receives it. Once the messaging module 120 receives a reply from the recipient through one of the messaging channels, it rescinds the messages sent to the other messaging channels to avoid overwhelming the user with duplicate messages. Going forward, the messaging module 120 may then use the reply channel as the proper channel for delivering future messages to the recipient.

Figure 6:
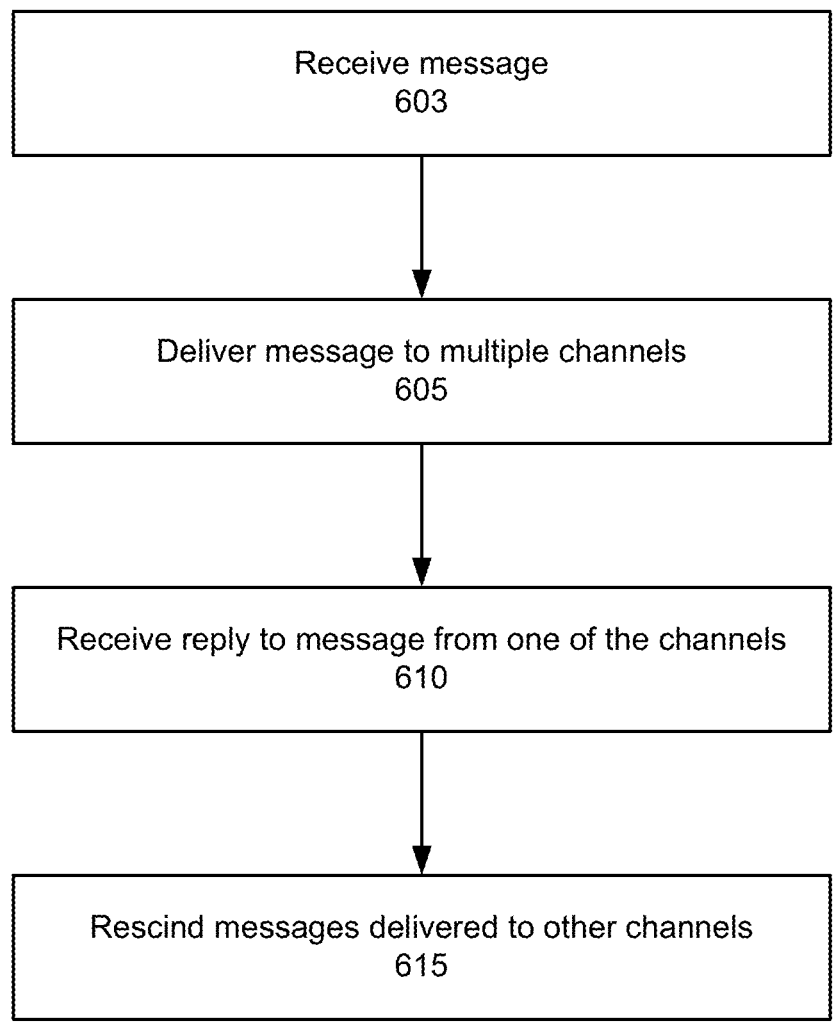
FIG. 6 illustrates a process flow for rescinding messages, according to an embodiment of the messaging module.

Referring now to FIG. 6, illustrated is a process flow for rescinding messages, according to an embodiment of the messaging module 120. In step 603, the messaging module 120 receives a message from a user of the messaging system that is intended for another user of the messaging system. For example, the message may be received from a user of a client device. In step 605, the messaging module 120 delivers the message to the recipient via multiple messaging channels that may be checked by the recipient of the message. For example, the messaging module 610 may deliver a message via multiple messaging channels selected through the process described in conjunction with FIG. 3.

In step 610, the messaging module receives a reply to the message, from the recipient of the message, via one of the messaging channels 615. For example, the original message may have been sent to the recipient via a web-chat channel and a XMPP channel. The recipient may then reply by sending a return message through the XMPP channel but not the web-chat channel.

In step 615, the rescission module 138 rescinds copies of the message that were sent to the other channels, i.e. the channels that the user did not reply from. For example, suppose a user receives copies of a message in both a web-chat window and via XMPP. If the user replies via XMPP, the rescission module 138 rescinds copies of the message sent via web-chat. In some embodiments, rescinding may include deleting copies of the message that were delivered via the other messaging channels. Alternatively, rescinding may include marking copies of the message as being read without deleting the message itself.

Some messaging channels may be rescindable channels, which are channels that the messaging server 101 can rescind messages from. Examples of rescindable channels include web-chat and email hosted by the messaging server 101. Some of the delivery channels may be non-rescindable channels, which are channels that the messaging server 101 cannot rescind messages from. Examples of non-rescindable channels include XMPP, SMS, mobile chat that relies on push notifications, and email hosted by other messaging servers 101. The messaging module 138 may rescind messages from the rescindable message channels but does not rescind messages from the non-rescindable channels.

The messaging module 120 may also rescind messages for other reasons. In one embodiment, the messaging module 120 receives an indication that a copy of a message delivered through a particular channel was read by the user. For example, the user may access the user's email messages through a web page by clicking on the message, and by virtue of clicking on the message, the messaging module 120 is provided with an indication that the message was accessed and read by the user. In response to receiving this indication, the messaging module 120 rescinds copies of the message that were delivered to the other messaging channels. In another embodiment, the messaging module 120 may rescind messages from a channel if the recipient does not read a message sent through that channel after a certain amount of time has elapsed.

Training the Messaging Module

In one embodiment, the messaging module 120 undergoes a training process that develops a predictive model for selecting messaging channels. The predictive model can then be used, for example in the process of FIG. 3, to select one or more messaging channels for delivering messages to their recipients. In one embodiment, the predictive model is a global model that can be applied to many users of the messaging system.

Generally speaking, the messaging module 120 builds the model by collecting training data that includes information about preferred messaging channels for a group of users and signals associated with the preferred messaging channels. For example, the messaging module 120 may deliver a message to a user through multiple messaging channels. The user replies to or views the message via one of the messaging channels, which provides the messaging module 120 with an indication of the messaging channel preferred by the user. The status of one or more signals is identified (e.g., recipient is traveling at high rate of speed when replying to or receiving the message) and is associated with the preferred messaging channel.

By accessing the training data and analyzing the relationships between the signals and the preferred messaging channels, the messaging module 120 generates a model that can be used to predict a messaging channel that is preferred by a message recipient. The model accepts certain signals as inputs and using the signals, generates channel scores for each messaging channel that are indicative of a recipient's preferred messaging channel(s). The predictive model may be updated as more training data is collected, allowing iterative refinement of the predictive model as more signals or messaging channels are used and/or as the system is updated such as by adding new messaging channels and notification mechanisms or other messaging features.

In one embodiment, the predictive model is a function that computes a score for each messaging channel with respect to a given recipient. For example, the function may be a weighted sum of various informational signals and is represented by the following formula:

$$Score_{NM} = A_N X_M + B_N Y_M + C_N Z_M +$$ (equation 1)

Where $Score_{NM}$ represents a channel score computed for a particular channel N and message recipient M. X, Y and Z are numerical representations of different information signals for a particular recipient M. A, B, and C are numerical weights for each of the signals. The weights A, B, and C are computed through a learning process that analyzes the relationship between the signals and channels preferred by users within a set of training data. When this function is applied to various messaging channels, a higher score indicates that a channel is preferred by a recipient, and a lower score indicates that the channel is not preferred by the recipient.

Figure 7:
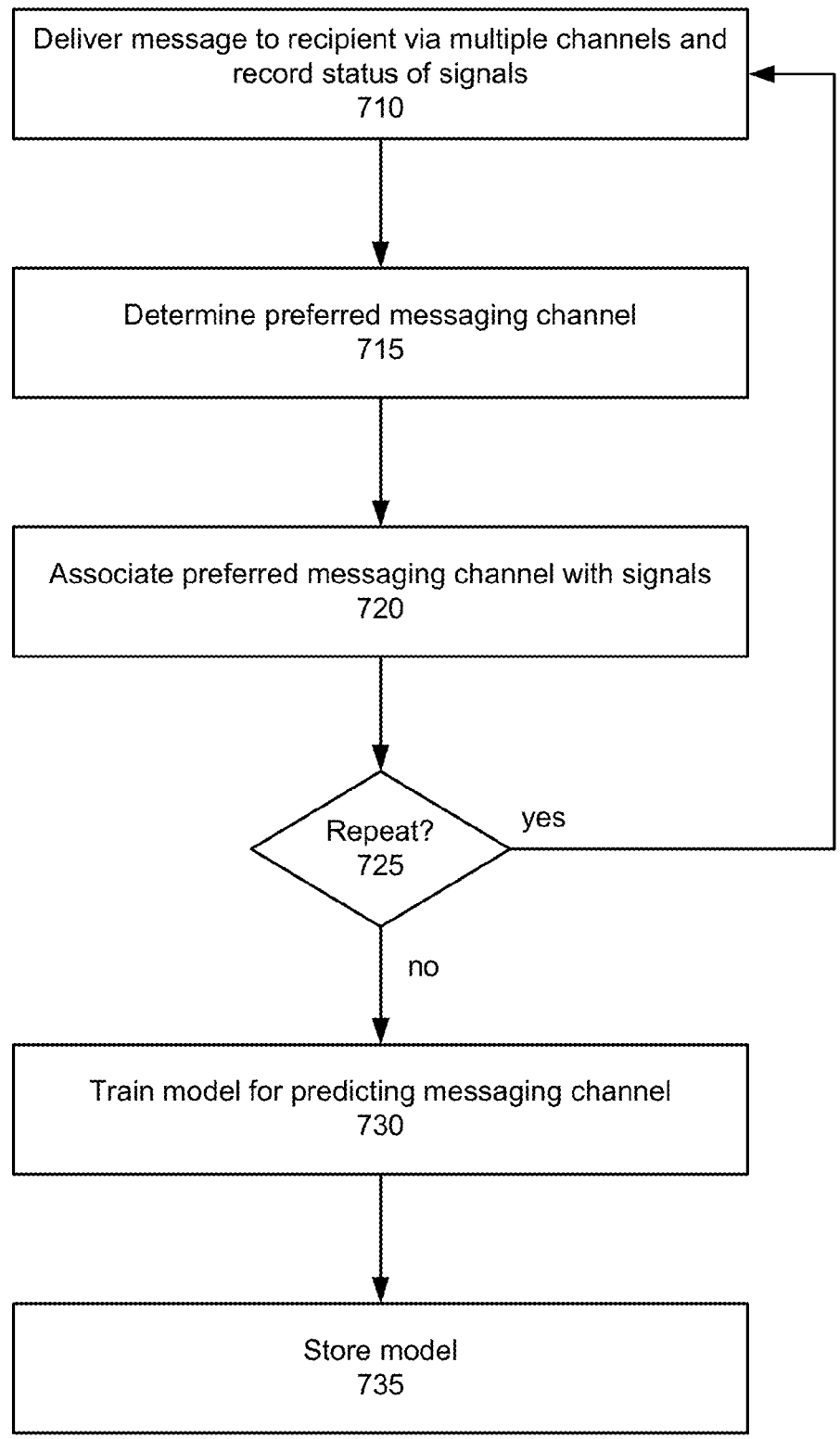
FIG. 7 illustrates a process flow for training a predictive model, according to one embodiment.

Referring now to FIG. 7, illustrated is process flow for training a predictive model, according to one embodiment. In step 710, the messaging module 120 delivers messages to a recipient through a plurality of messaging channels. Also in step 710, the messaging module 120 records the status of one or more informational signals associated with the user and/or message when the message is delivered. For example, when sending a message to a particular recipient, the messaging module 120 may also record information indicating that the recipient is traveling at a high rate of speed. Many different types of signals can be recorded, which helps to improve the accuracy of the model that will be generated from this information.

In step 715 the messaging module 120 determines a messaging channel that is preferred by the recipient of the message. In one embodiment, the recipient may reply to the message via one of the messaging channels, which is treated as an indication that the reply channel is the recipient's preferred channel. In another embodiment, the recipient may read a copy of the message using one or more of the messaging channels, and the first channel used to read the message is treated as indication of the preferred messaging channel. In another embodiment, the messaging module 120 may prompt the user as to which messaging channel is the preferred messaging channel. For example, the user may be presented with the question "Which channel do you prefer to receive the message from." The user's response to the prompt is then treated as an explicit identification of the preferred messaging channel.

In step 720 the messaging module 120 associates the preferred messaging channel with the status of the recorded information signals. In one embodiment, the relationship between the messaging channels and the signals are stored into a co-occurrence table. Each entry in the co-occurrence table specifies how often a particular signal occurs in conjunction with a preferred channel. The following is a basic example of a co-occurrence table:

| Channel | Speed over 5 mph? | Calendar Entry? |
| --- | --- | --- |
| Mobile chat | 850 | 120 |
| Email | 100 | 820 |

In the table, when the recipient's speed of travel is over 5 mph, the mobile chat channel is the preferred messaging channel 850 times and the email channel is the preferred messaging channel 100 times. When a calendar entry indicates that the recipient is busy, the mobile chat channel is the preferred messaging channel 120 times and the email channel is the preferred messaging channel 820 times. The data in the co-occurrence table thus indicates that when compared to the email channel, the mobile-chat channel is used frequently when the recipient is traveling at a high rate of speed (e.g., recipient in a car). The data also indicates that the e-mail channel is used frequently when a user's calendar entries indicate that the user is busy (e.g., the user is in a meeting).

In step 725, the messaging module 120 repeats the process to collect more information about the relationships between the signals and the messaging channels. The process may be repeated any number of times until a statistically significant amount of information is collected. Once the collection of training data is complete, the process proceeds to step 730

In step 730, the messaging module 120 trains a model that can be used for predicting one or more messaging channels that is preferred by a recipient of a message. As the model is generated from data collected from many users, the model is a global model that can be applied to one or more different users of the messaging system. In other embodiments, the model may be tailored to a particular user by collecting data only from that particular user and generating the model from that information.

In one embodiment, the strength of the relationship between a signal and a messaging channel, as indicated by their co-occurrences, is used to generate a weight for each signal for each messaging channel. Referring again to Equation 1, the weights are the variables such as A, B and C. The weights may be scaled between some lower and upper bound (e.g., 0 to 100). For example, for the mobile chat channel a high rate of speed may be associated with a weight of "85" and a calendar entry may be associated with a weight of "12". For the email channel, a high rate of speed may be associated with a weight of "12" and a calendar entry may be associated with a weight of "82." In some embodiments, the weights may be scaled both between different channels as well as across different signals to emphasize the importance of certain signals. In other embodiments, the model may be represented by more complex or different functions than that presented in Equation 1.

In step 735, the messaging module 120 stores the predictive model to a storage device, such as a non-transitory storage medium or memory. The model is later used to automatically select one or more messaging channels for delivering a message to a user of the messaging system. For example, given a set of input signals for a given message and recipient of the message, the messaging module 120 uses the predictive model to determines channel scores for different messaging channels. In one embodiment, channels with scores that exceed a threshold are selected as the proper messaging channels. The threshold may be relative (e.g., above $50^{th}$ percentile) or absolute. In other embodiments, the messaging module 120 considers the scores in combination with other factors (e.g., monetary cost or transmission delay) in selecting the proper messaging channels. Beneficially, training and then generating a model in this manner allows for accurate prediction of a messaging channels preferred by a user, which enables messages to be delivered to the user via the appropriate messaging channels.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving information identifying a recipient of a message, wherein the recipient is a user of a messaging system;
selecting, automatically by the messaging system, at least two messaging channels from a plurality of messaging channels for delivering the message to the recipient;
responsive to selecting the at least two messaging channels, providing for display in a user interface a visual indication of the at least two messaging channels selected for delivering the message to the recipient, the user interface comprising a first region for displaying a message thread and a second region for displaying the visual indication of the at least two messaging channels;
delivering the message to the recipient via the at least two messaging channels selected for delivering the message to the recipient;
receiving, by the messaging system, a reply to the message from the recipient via a first messaging channel of the at least two messaging channels selected for delivering the message to the recipient;
responsive to receiving the reply to the message via the first messaging channel, de-selecting, automatically by the messaging system, a second messaging channel of the at least two messaging channels selected for delivering the message to the recipient and updating the visual indication of the user interface to indicate that the second messaging channel of the at least two messaging channels selected for delivering the message to the recipient is de-selected; and
delivering a new message to the recipient via only the first messaging channel after updating the visual indication to indicate that the second messaging channel of the at least two messaging channels is de-selected.

2. The method of claim 1, wherein selecting the at least two messaging channels comprises selecting the at least two messaging channels based on one or more signals.

3. The method of claim 2, wherein the messaging system is a social networking system and selecting the at least two messaging channels comprises:
selecting the at least two messaging channels based on information about a social relationship in the social networking system between a sender of the message and the recipient of the message. ssaging channels comprises selecting the at least two messaging channels based on one or more signals.

4. The method of claim 1, wherein providing the visual indication of the at least two messaging channels comprises providing a textual description of the at least two messaging channels.

5. The method of claim 1, wherein providing the visual indication of the at least two messaging channels comprises providing at least two graphics that represent the at least two messaging channels.

6. The method of claim 1, further comprising:
determining a presence of the recipient with respect to at least one of the at least two messaging channels; and
providing, for display in the user interface a visual indication of the presence of the recipient.

7. The method of claim 1, further comprising:
determining a location of the recipient; and
providing, for display in the user interface a visual indication of the location of the recipient.

8. The method of claim 1, further comprising:
receiving a first message from the recipient via the first messaging channel ;
receiving a second message from the recipient via the second messaging channel; and
providing, for display in the first region of the user interface, the first message and the second message as part of the message thread.

9. The method of claim 1, wherein the messaging channels comprise at least one of web-chat, email, and mobile-chat channels.

10. The method of claim 1, wherein the first messaging channel is e-mail.

11. The method of claim 1, wherein the first messaging channel is web-chat.

12. The method of claim 1, wherein the first messaging channel is mobile-chat.

13. The method of claim 1, wherein the first messaging channel is short message service (SMS).

14. The method of claim 1, wherein selecting the at least two messaging channels from the plurality of messaging channels comprises selecting two messaging channels from three or more messaging channels.

15. A non-transitory computer-readable medium containing executable program code for:
receiving information identifying a recipient of a message, wherein the recipient is a user of a messaging system;

selecting, automatically by the messaging system, at least two messaging channels from a plurality of messaging channels for delivering the message to the recipient;

responsive to selecting the at least two messaging channels, providing for display in a user interface a visual indication of the at least two messaging channels selected for delivering the message to the recipient, the user interface comprising a first region for displaying a message thread and a second region for displaying the visual indication of the at least two messaging channels;

delivering the message to the recipient via the at least two messaging channels selected for delivering the message to the recipient;

receiving, by the messaging system, a reply to the message from the recipient via a first messaging channel of the at least two messaging channels selected for delivering the message to the recipient;

responsive to receiving the reply to the message via the first messaging channel, de-selecting, automatically by the messaging system, a second messaging channel of the at least two messaging channels selected for delivering the message to the recipient and updating the visual indication of the user interface to indicate that the second messaging channel of the at least two messaging channels selected for delivering the message to the recipient is de-selected; and delivering a new message to the recipient via only the first messaging channel after updating the visual indication to indicate that the second messaging channel of the at least two messaging channels is de-selected.

* * * * *

UNITED STATES PATENT AND TRADEMARK OFFICE
CERTIFICATE OF CORRECTION

PATENT NO.         : 8,880,627 B2
APPLICATION NO.    : 13/205208
DATED              : November 4, 2014
INVENTOR(S)        : Benjamin Peter Davenport et al.

Page 1 of 1

It is certified that error appears in the above-identified patent and that said Letters Patent is hereby corrected as shown below:

Claims

Column 16, claim 3, lines 20-22, after "recipient of the message." delete "ssaging channels comprises selecting the at least two messaging channels based on one or more signals."

Signed and Sealed this
Twenty-sixth Day of July, 2016

Michelle K. Lee
*Director of the United States Patent and Trademark Office*